April 21, 1925.
J. F. W. DIEGEL
1,534,637
SAW FILING MACHINE
Original Filed June 15, 1923
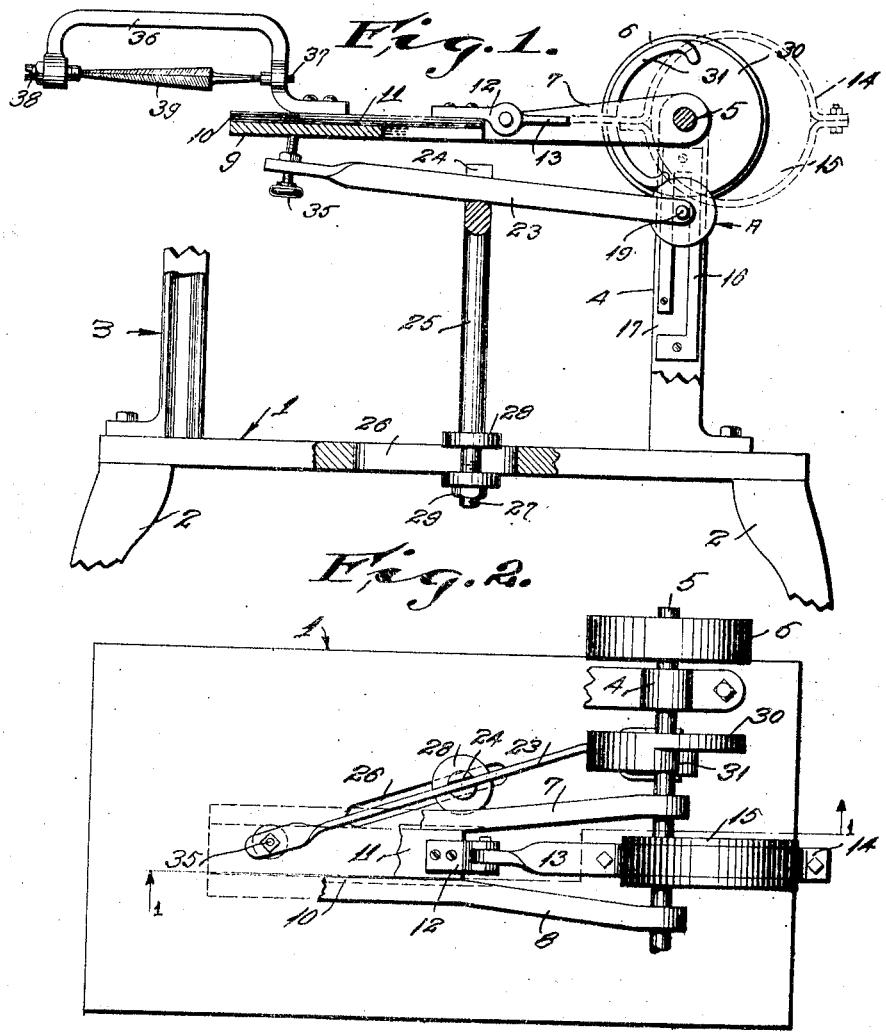

Patented Apr. 21, 1925.

1,534,637

UNITED STATES PATENT OFFICE.

JOHN F. W. DIEGEL, OF MANITOWOC, WISCONSIN.

SAW-FILING MACHINE.

Application filed June 15, 1923. Serial No. 645,696. Renewed February 18, 1925.

*To all whom it may concern:*

Be it known that I, JOHN F. W. DIEGEL, a citizen of the United States, and resident of Manitowoc, in the county of Manitowoc and State of Wisconsin, have invented certain new and useful Improvements in Saw-Filing Machines; and I do hereby declare that the following is a full, clear, and exact description thereof.

My invention relates to improvements in saw filing machines, and is particularly directed to a class similar to that disclosed in my patent of May 24, 1921, Number 1,379,252.

The object of my invention is to provide a machine for automatically sharpening the teeth of a saw.

Another object of my invention is to provide a saw filing machine, the filing element of which is moved back and forth, with respect to the saw, in a manner similar to the motion imparted to a file when the work is done by hand.

A still further object of my invention is to provide means for moving the file with respect to the saw, and giving the same a reciprocatory movement together with an up and down movement.

Another object of my invention is to provide means for adjusting the movement of a file with respect to the saw tooth operated upon, thereby permitting saw teeth of various lengths to be sharpened.

Other objects of my invention will be apparent from a study of the hereinafter description, together with the drawings, and it will be noted that I have provided a new and improved machine for filing saws, of simple construction, strong and durable and one which is adapted for filing saws of different kinds as hand saw, band saws, circular saws and the like.

In the accompanying drawings, in which my invention is fully illustrated:—

Figure 1 is a vertical sectional view taken on the line 1—1 of Fig. 2;

Fig. 2 is a top plane view of Fig. 1, showing therein the main operating elements of my machine; and Fig. 3 is a detail view of the guide for a lever which moves the file up and down.

The various operating parts of my machine are mounted upon a suitable frame, together with the means for holding the saw while being operated upon. As regards the detailed structure or material, the construction of the frame of the machine is immaterial, it being possible for a mechanic to devise a frame suitable for the purpose.

Referring to the drawings in detail, I have shown a supporting frame having a base 1, the same being mounted upon suitable supporting legs 2 and upon the base 1 is mounted the operating means of my improved machine together with the means for holding the saw while being acted upon, the latter being briefly designated by the numeral 3, the detail structure of which is immaterial so long as it supports a saw in such a way that it will be acted upon by the file hereinafter to be described. It is of course to be understood that in machines of this character the saw moving means is constructed in such a manner that the same will be moved step by step and a distance equal to the distance between adjacent teeth of the saw at each operative stroke of the file.

The base 1 has secured thereto a pair of vertically disposed uprights, one of which I have shown in the accompanying drawing and designated by the numeral 4. The upper end of the uprights has rotatably mounted therein a shaft 5, the same being driven by any suitable means; for instance, a pulley wheel 6 keyed to one end of the shaft 5 and around which a belt from any driving means is adapted to be passed.

The shaft 5 has pivotally mounted thereon a pair of arms 7 and 8, the outer ends of which are connected to a bed plate 9 which may be made integral therewith if so desired. The adjacent edges of each of the arms 7 and 8 is provided with a dovetailed groove 10 in which a slide plate 11 is adapted to reciprocate. One end of the plate 11 has secured thereto a bifurcated hinge member 12 to which is pivoted a connecting rod 13 the free end of which is rigidly connected to an eccentric strap 14 fitted about the periphery of an eccentric 15 keyed to the shaft 6.

Thus it will be observed that upon rotation of the shaft 5 the eccentric 15 will cause the slide plate 11 to reciprocate between the arms 7 and 8 for a purpose hereinafter to be fully described.

Referring to Figs. 1 and 3 it will be seen that I have secured to one face of the vertical upright 4 a dovetailed guideway 16, the same having an entrance 17, in which is mounted for up and down movement a plate 18 the central portion of which has secured thereto a stub shaft 19. The shaft 19 has placed thereon a bearing sleeve 20 upon which is rotatably mounted a roller A.

The shaft 19 has pivoted thereon, and upon the bearing sleeve 20, the arms 21 and 22 carried by the end of a lever 23, the intermediate portion of which is supported within the bifurcated end 24 of a vertical standard 25 which is movable within a slot 26 formed in the base 1 and disposed under the intermediate portion of the lever 23. By reference to Figure 1 it will be seen that the standard 25 has formed integral therewith and adjacent a threaded end portion 27, a collar 28 which supports the standard upon the base, and by means of the threaded end portion 27, having thereon a clamping nut 29 the standard may be positioned any place within the limits of the slot 26, thereby increasing or decreasing the movement of the free end of the lever 23, for a purpose hereinafter described.

The shaft 5 has further secured thereto a disc 30 one face of which has made integral therewith, and extending around approximately one half of its circumference, a cam 31 which is engageable with an enlarged portion 32 of the roller A, while a portion of the periphery of the disc 30 is adapted to engage a reduced portion 33 of the roller. Thus it will be apparent that as the disc 30 rotates the roller A, in contact therewith, will be moved up and down within the guide-way 16, formed upon the upright 4, thus imparting an up and down movement to the free end of the lever 23, connected to the roller shaft and fulcrumed upon the standard 25.

The free end of the lever 25 has threaded therein a hand screw 35 upon the end of which rests the bed plate 9 connecting the arms 7 and 8, previously referred to.

The outer end of the slide plate 11 has secured thereto a U-shaped frame 36, one leg of which is provided with a socket 37 while the other leg has a removable socket 38 for the reception therebetween of a file 39. It will be of course understood, by reference to Fig. 1, that the sockets 37 and 38 are adjustable within the frame, thereby accommodating files of various lengths.

In the operation of my improved machine, the saw to be sharpened is supported by the saw supporting means 3 and moved step by step by any suitable means desired. The file is positioned upon the saw and by means of the adjusting screw 35 the limit of the downward movement of the file upon the saw may be controlled. It is preferably desired that this limit be so adjusted that the file will bear upon the base of the tooth. Having thus adjusted the various parts of the machine motion is imparted to the shaft 5 and as the same rotates the eccentric 15 will cause the file to be reciprocated upon the saw, and at the end of its reciprocation the cam 31 will engage the enlarged portion 32 of the roller A, thereby forcing the same down within the guideway 16 and raising the free end of the lever 23, which in turn raises the arms 7 and 8, together with the file 39. This movement removes the file from in contact with the saw tooth and the same is held in this position, by the cam 31 until the eccentric has made one-half of its revolution, during which time the file is returned to its initial position, that is, the beginning of its operative stroke. On the completion of this movement, the cam 31 disengages the roller A and permits the same to move upwardly until the reduced portion 33 of the roller engages its portion of the disc 30, until the file rests upon the saw, thus permitting the file carrying frame to move downwardly so that the file may operatively engage a tooth of the saw and be moved with respect thereto in a manner previously described.

From the above description it will be apparent that by means of the adjusting screw 35, and the movement of the standard 25, upon which the lever 23 is fulcrumed, the up and down movement of the file may be adjusted to a nicety, thus permitting the sharpening of teeth of various lengths.

The eccentric and the cam elements carried by the shaft are so timed with respect to each other that the up and down movement of the file is not started until near the completion of its back and forth movement, thereby preventing the file from coming down upon the saw during its horizontal movement and sharpening the tooth in an inferior manner.

During the filing stroke of the machine, it is obvious that the file 39 may sustain the weight of the arms 7 and 8, and all parts carried thereby. The weight of these parts upon the file will ordinarily exert sufficient pressure to cause it to cut effectively, but in no case will this pressure cause the file to cut beyond a distance equivalent to the distance controlled by the enlarged and reduced portions of the roller A.

From the foregoing, it is thought that the construction, operation and many advantages of the herein described invention will be apparent to those skilled in the art, without further description, and it will be understood that various changes in the size, shape, proportion, and minor details of construction may be resorted to without departing from the spirit or sacrificing any of the advantages of the invention.

Having thus fully described my invention, what I claim as new and desire to secure by Letters Patent, is:—

1. A saw filing machine having a rotary driving shaft and operating elements carried thereby, a table journaled to said shaft, a file holder slidable upon said table and moved back and forth by one of said operating elements, a standard carried by the base of the machine and supporting therein a lever, one end of which supports said table, and the other end of said lever engageable with another of said operating elements for imparting an up and down movement to said table.

2. A saw filing machine having a rotary driving shaft and operating elements carried thereby, a table pivoted to said shaft, a file holder slidable upon said table, and moved back and forth by one of said operating elements, a standard carried by the base of the machine and supporting therein a lever one end of which supports said table, and the other end of said lever engageable with another of said operating elements for imparting an up and down movement to said table upon the completion of the first said movement.

3. A saw filing machine having a rotary driving shaft and operating elements carried thereby, a table pivoted to said shaft, a standard movable upon said machine and supporting therein a lever, means carried by one end of said lever for supporting said table, a file holder slidable upon said table and moved thereon by one of said operating elements, and the other end of said lever engageable with another of said operating elements for imparting to said table an up and down movement.

4. A saw filing machine having a drive shaft, a table pivoted thereto, a support for the end of said table, a standard movable in a horizontal plane with respect to said machine and in which said support rests, a file holder slidable upon the table, means carried by said shaft for moving said holder back and forth upon said table, and a second means carried by the shaft and adapted to engage the table support for holding the table in different planes during each movement of the file holder thereon.

5. A saw filing machine having a rotary driving shaft, a table swinging upon said shaft and adapted to extend in substantially a horizontal plane, a file holder on said table and reciprocated thereon by an element carried by said shaft, a support, a lever adapted for rocking movement within said support and supporting the free end of said table, and an element carried by said shaft and engageable with the other end of said lever for moving said table upon said shaft.

In testimony that I claim the foregoing I have hereunto set my hand at Manitowoc, in the county of Manitowoc and State of Wisconsin.

JOHN F. W. DIEGEL.